Patented Mar. 17, 1942

2,276,893

UNITED STATES PATENT OFFICE 2,276,893

POLYMERIZATION OF OLEFINS TO HIGH MOLECULAR WEIGHT HYDROCARBON POLYMERS

Robert M. Thomas, Union, and Irving E. Lightbown, Elizabeth, N. J., assignors to Standard Oil Development Company, a corporation of Delaware No Drawing. Application December 31, 1938, Serial No. 248,790

7 Claims. (Cl. 260—93)

This invention relates to an improved catalytic process and more especially to improved methods of carrying out exothermic reactions which lead to the production of synthetic high molecular weight linear polymerization products, by which term it is intended to include products made by co-polymerization as well as simple polymerization.

Many different variations in reaction conditions have been used for such polymerization processes in the past, but these have not been attended with entirely satisfactory results owing to the great difficulty of properly controlling a polymerization reaction which, when very high molecular weight products are produced, are both substantially instantaneous and also exothermic. In other words, much heat is liberated in a very short time (usually only a few seconds or even a fraction of a second), and this large amount of heat must be very rapidly removed from the reaction zone or else the temperature of the polymerizing mass will rise to an undesirably high degree. For instance, in polymerizing isobutylene with a boron fluoride catalyst to make polymers having molecular weights from 1,000 to 200,000 or more, especially those above about 27,000, it is desirable to always maintain the temperature below —10° C., preferably at least as low as —40° C., or even as low as —100° C., to obtain the highest molecular weight polymers. In such a process, if the temperature is allowed to rise, the product wil have a very much lower molecular weight.

Similarly, if aluminum chloride is used as a catalyst either for polymerizing isobutylene or co-polymerizing it with other materials such as butadiene, in order to obtain molecular weights substantially above 1,000, it is desirable to use a similarly low temperature, and, as far as possible, prevent rise of temperature during the polymerization.

Internal cooling by evaporation of a liquefied normally gaseous hydrocarbon and vigorous agitation during the reaction are very useful in helping to prevent rise of temperature during polymerization, however, even when using such means, there is frequently, if not always, some local overheating when the catalyst first comes in contact with the polymerizable constituent(s).

It has now been found possible, and is a primary object of the invention, to avoid such local overheating by injecting the catalyst in a liquid state in a very finely divided form such as in the form of a spray of fine droplets having volumes of not substantially more than .01 cc. into the mass to be polymerized. This may be accomplished by spraying or atomizing or any other suitable means. The droplets are preferably not larger than .001 cc. in volume, and best results are obtained when they are even finer in the form of a mist, the droplets of which probably have a volume of the order of .00001 cc. to .0001 cc. Such a mist spray may be obtained by ejecting the catalyst solution under pressure of 10 to 1,000 lbs./in.² through a fine orifice as in various conventional spray nozzles on the market, for instance having an orifice of $\frac{1}{64}$, $\frac{1}{32}$ or $\frac{1}{16}$ inch in diameter. The smaller the orifice and the higher the pressure, the finer will be the droplets or spray.

Another object accomplished by injecting the catalyst solution or suspension in the form of finely dispersed particles into the polymerizable liquid, is to prevent accumulation of unreacted catalyst in the polymerized product because in some of such processes continued contact of the polymer with the catalyst will cause undesirable side reactions to take place which impair the desired properties of the product.*

Styrene and many other materials which polymerize to high molecular weight products, may be treated according to this invention.

One chemical reaction in which the invention has been found to have a tremendous advantage over prior methods of operation is the co-polymerization of isobutylene with butadiene in the substantially complete absence of normal olefines, at a temperature substantially below —40° C. or —50° C., in the presence of a catalyst such as aluminum chloride dissolved in an inert and low freezing point solvent, such as a suitable low molecular weight alkyl halide. In carrying out this process, the catalyst is best prepared by making a 5% solution, for example, of aluminum chloride in ethyl chloride at room temperature (or any temperature above about —20° C.); then preferably diluting this solution to a catalyst concentration of 0.1% to 2.0%, preferably 0.3% to 1.0% and cooling this solution down to a temperature such as —78° C. (obtained by using acetone containing solidified carbon dioxide as refrigerant or preferably, powdered $CO_2$ directly as an internal refrigerant) or —95° C. (obtained by using liquefied ethylene as refrigerant). This solution is then sprayed into a solution of isobutylene and butadiene preferably agitated or kneaded, containing, at least 50%, preferably at least 70%, for instance 80% to 90% of isobutylene and not less than 5% or 10% but not more than 50% of butadiene and admixed with 100% to 250%, preferably 150% to 200%, by volume of liquefied ethylene (on the basis of the total volume of isobutylene and butadiene) to absorb the heat of polymerization by evaporation of the ethylene. The catalyst concentration should vary inversely with the amount of catalyst solution used; for instance, in treating a batch containing 2,000 volumes of $C_4$ liquid (mixture of isobutylene and butadiene), ap- ---
* Another object of the invention is to make possible the use of less dilute solutions of polymerizable raw material.

proximately 600-700 volumes of catalyst solution having a concentration of 0.4% will be required whereas only 300-350 volumes of 0.8% concentration catalyst would be required, to produce substantially similar results.

The spraying or atomizing may be accomplished in several different ways, for instance, by forcing the catalyst solution through a straight fine orifice (forming a fine stream which then breaks into droplets). Another way is to force the solution through a cone-nozzle which narrows down to a fine orifice. A still further way is to use the aspirator principle using an inert gas such as nitrogen under pressure to suck up the catalyst solution and eject it through a suitable nozzle.

The cooling of the catalyst solution may either be accomplished externally, or internally as by solidified carbon dioxide; cooling internally with ethylene may cause a milkiness in the solution (if too much ethylene is added) and a consequent slight porosity in the cured products.

20% to 50% or so yields of a vulcanizable copolymer are obtained usually in the form of small discrete particles. The results of this spray injection are so much superior to those obtained by ordinary agitation by an electric motor, stirrer, kneader or stirring by hand, that they are highly unexpected. Products of greatly improved molecular weight and tensile strength are obtained will be shown in the following examples.

EXAMPLE 1

A dilute (0.4%) catalyst solution was prepared by dissolving aluminum chloride in ethyl chloride at room temperature and the resulting solution was sprayed in the form of a very fine stream from an ordinary wash bottle into a solution consisting of isobutylene containing about 20% butadiene at a temperature of −78° C., this temperature being maintained by having solidified carbon dioxide present. The copolymer produced was substantially superior to the product formed in a number of previous tests carried out by ordinary agitation instead of spraying.

EXAMPLE 2

Using 20% butadiene and 80% isobutylene, three batches were polymerized, in all cases using a dilute catalyst solution containing about 0.4% of aluminum chloride in ethyl chloride. This catalyst solution was sprayed through an atomizer head as fine drops (almost a mist) directly into the reaction mixture which was stirred fairly slowly with a stirring rod. Before the catalyst entered the atomizer head it was cooled by forcing it under 100 lbs. pressure of nitrogen through a 50 foot spiral tube of copper which was immersed in a Dewar flask filled with either dry ice and alcohol or with liquid ethylene. The first two batches were made by using dry ice for cooling the reaction (in one of these the catalyst solution was precooled by dry ice and in the other it was precooled by ethylene) and in the third batch the reaction was cooled by ethylene. In each reaction, the copolymer formed readily as a white flocculent material, being in the form of a ball of rubbery quality when dry ice was used for cooling the reaction liquid and being in the form of small hard discrete particles when ethylene was used for cooling the reaction. There seemed to be no difference in the product whether the catalyst was cooled in the ethylene or in dry ice. After formation, the copolymer was soaked in isopropyl alcohol and then kneaded in a kneader heated with high pressure steam to a temperature of 130° C. The product of batches 1 and 2 (in which dry ice was used for cooling) was washed once with water whereas the product of batch 3 (cooled with ethylene) was heated with several washings of water then with caustic soda solution and then kneaded until dry. Both products were then compounded with zinc oxide, stearic acid, sulphur and vulcanization accelerator, with or without carbon black and a pigment; the compounded product was then cured under various conditions of temperature and time and the resulting products were subjected to tensile strength and elongation tests. The results of these compounding and curing tests are as follows: In each case for 100 parts by weight of copolymer, the following materials were compounded therewith:

Zinc oxide _____ 5
Stearic acid _____ 3
Sulphur _____ 4
Butyl "Zimate" _____ 1.5
"Captax" _____ 0.5

TABLE 1

*Making copolymer by spraying*

A. PRODUCT OF BATCHES COOLED BY CO₂, (USING PROPANE OR BUTANE AS DILUENT)

| | Test No. | | | |
|---|---|---|---|---|
| | 1 | 2 | 3 | 4 |
| Copolymer | 100 | 100 | 100 | 100 | 100 |
| Gas black | | 10 | 50 | 50 | |
| TiO₂ | | | | | 20 |
| Curing temp. °C | 150 | 150 | 150 | 150 | 150 |
| Min | 45 | 30 | 60 | 120 | 30 |
| Tensile str. lbs./in.² | | 1,000 | 1,840 | 1,880 | |
| Elong. percent | | | 600 | 475 | |
| Remarks | Good, non-porous, very few bubbles. | Good | Leathery and not springy. | | |

B. PRODUCT OF BATCHES COOLED BY LIQUID ETHYLENE

| | Test No. | | | | | | |
|---|---|---|---|---|---|---|---|
| | 5 | 6 | 7 | 8 | 9 | 10 | 11 |
| Copolymer | 100 | 100 | 100 | 100 | 100 | 100 | 100 |
| Gas black | | 10 | 50 | 50 | | | |
| TiO₂ | | | | 20 | | | |
| Temp. °C | | | | | 150 | 135 | 135 |
| Min | 30 | 30 | 60 | 120 | 30 | 60 | 45 | 120 |
| Tensile lbs./in.² | 1,735 | 2,100 | 2,360 | 2,230 | | 1,250 | 1,450 | 1,990 |
| Elong. percent | 900 | | 700 | 700 | | 900 | 900 | 925 |
| Remarks | Excellent, non-porous, no bubbles. | Good, possibly undercured. | Leathery and not springy. | | Probably undercured Rerun 1,520 875 | Probably undercured Dusted with talc 1,840 925 10 parts S | 15 parts. S |

In contradistinction to the above tests in which tensile strengths ranging from 1,000 lbs. to 2,300 lbs. per sq. in. were obtained, it should be noted that prior to this method of spraying the catalyst into the polymerizable constituents, tensile strengths of the cured copolymer could not be determined because the vulcanizate was usually bad-blistered and bubbled and had little strength "Captax" is the trade name of mercapto benzothiazole and butyl "Zimate" is the zinc salt of dibutyl dithiocarbamate. Instead of using those particular compounds it is of course possible to use other mercapto thiazoles or other dithiocarbamates, or "Tuads" which is a tetramethylthiuram disulfide.

EXAMPLE 3

In this set of tests two batches of copolymer were made using substantially the same proportions of materials as in Example 2 and those batches were substantially alike except that in the one batch ordinary agitation (i. e. non-spraying method) was used whereas in the other batch the catalyst was sprayed as in Example 2. In this set of tests a small amount of "Agerite" powder was compounded into the finished copolymer along with sulfur and other ingredients and then the compounded product was heated in a "Banbury" mixer for a half hour, taken out, cooled, compounded with 1% diphenyl guanidine and 2% of butyl "Zimate" and then cured. The results of the test are as follows:

TABLE 2

| | Curing | | Tensile strength, lbs./in.$^2$ | Percent elongation | Remarks |
|---|---|---|---|---|---|
| | Temp. °C. | Hrs. | | | |
| Spraying | 138 | 1 | 2,800 | 1,000 | Good appearance. |
| | | 4 | 2,800 | 1,000 | |
| Non-spraying | 130 | 1 | 640 | 625 | |
| | | 3 | 635 | 325 | |

This table shows that the tests that were made by spraying produced a tensile strength which was 4½ times as great as that obtained by ordinary agitation.

EXAMPLE 4

In order to ascertain the effect of the use of a spray nozzle having a relatively large orifice as compared to a small one, two tests were made which were substantially identical in practically every other respect, the process used being in general similar to that used in Example 2. The results of this test are as follows:

| Nozzle orifice (diam.) | Mol. wt. | Tensile strength, lbs./in.$^2$ |
|---|---|---|
| .040 in | 56,500 | 2,950 |
| .018 in | 71,000 | 2,960 |

This table indicates that when making copolymer with 20% butadiene and 80% of isobutylene and spraying the catalyst solution into the polymerized constituents, it is better to use a spray nozzle diameter of .018 in. rather than .040 in. because the smaller diameter nozzle produced a copolymer having a somewhat higher molecular weight than did the larger diameter nozzle, although the tensile strength of both products was nearly alike.

EXAMPLE 5

By slight variations of the process described in Example 2, the spray method of making copolymers may be made to yield products of even considerably higher tensile strength. For instance, 1,600 volumes of pure isobutylene (re-distilled and caustic-scrubbed) were mixed with 400 volumes of butadiene and 1¾ parts of ethylene for each part of the mixture of isobutylene and butadiene, and into this solution was sprayed a dilute catalyst solution of about 0.44% of aluminum chloride in methyl chloride which had been precooled to a temperature of about −78° C. (the methyl chloride used for the catalyst was scrubbed with 96% sulphuric acid and then dried under soda ash and lime). The temperature of the reaction mixture was maintained at about −93° C. The reaction was stopped after about 7 to 10 minutes when the yield was about 40% or 45% and the resultant copolymer was washed and kneaded as in previous examples. After compounding and vulcanizing, the product had a tensile strength of 3,340 lbs. per square inch. This high strength is partly due to the use of methyl chloride as a solvent for the catalyst, but in any case using the spray method of mixing the catalyst in with the polymerizable constituents accomplishes a greater tensile strength than would be obtainable by ordinary agitation.

In such copolymerization processes, it is understood of course, that a number of variations may be made as to the raw materials used and the reaction conditions. For example, instead of isobutylene, other low molecular weight olefins, preferably other iso-olefins, such as 2 methyl butene-1, may be used, and instead of butadiene, other low molecular weight diolefins, preferably conjugated diolefins, such as isoprene and the like, may be used. Pure materials of both types are preferred, because higher molecular weight products result but if absolutely pure materials cannot be used, the impurities to be particularly guarded against and reduced to as low a content as possible are sulfur compounds and normal olefines. Also, instead of aluminum chloride, one may use aluminum bromide, titanium tetrachloride, and the like, or complexes of these catalysts or of aluminum chloride, with various organic liquids which serve as solvent or liquid dispersion medium for the catalyst; for instance, instead of ethyl chloride, methyl chloride is even better, but one may also use other solvents such as isopropyl chloride, chloroform, sulfuryl chloride (SO$_2$Cl$_2$) carbon disulfide, etc. Instead of using liquid ethylene as a solvent and refrigerant, for the reactants, it is possible to use ethane, propane, a refined saturated fraction of naphtha, or other suitable low molecular weight hydrocarbons as solvent for the olefin and di-olefin, and as refrigerant an inert normally gaseous material, e. g. solidified carbondioxide which is capable of absorbing a substantial amount of latent heat of evaporation. Aluminum chloride will not dissolve in ethyl chloride at low temperatures, such as −78° C. or −95° C. Consequently, satisfactory results are not obtained by merely adding aluminum chloride at such low temperatures to a premixed solution of olefins, diolefins, and solvent or diluent, but, as indicated above, the catalyst should be dispersed (i. e. at least partially dissolved) at room temperature or even at elevated temperature in a suitable liquefied medium which is inert or which serves to promote or supplement the catalyst.

Although it is preferred to make vulcanizable copolymers, as by the method described above, it is also possible to make an ordinary or unvulcanizable copolymers by using other reaction conditions, such as higher temperatures, higher proportions of diolefins, etc.

Another important chemical reaction in which the invention has been found particularly advantageous is the polymerization of isobutylene alone at low temperatures such as below −10° C. and even as low as −103° C. (as obtained by using liquefied ethylene as refrigerant) or lower, in the presence of an active halide polymerization catalyst, such as aluminum chloride dissolved in ethyl chloride or other suitable solvents such as those mentioned above for the isobutylene-butadiene copolymerization. Also, if desired, even a gaseous catalyst, such as boron fluoride may be used if dissolved or dispersed under pressure in a suitable liquid medium such as methyl or ethyl chloride. In this polymerization of isobutylene, it is also desirable to have present a substantial amount of a solvent, diluent and/or refrigerant, such as liquefied ethylene or propane or other liquefied normally gaseous hydrocarbons which are normally not polymerizable under the conditions used for the polymerization of the isobutylene. This refrigerant should be present in sufficient amount to absorb the heat of polymerization of the isobutylene and, generally, for this purpose, there are required about 1 to 2 volumes of refrigerant to 1 volume of isobutylene (all on liquid phase basis).

The advantages of applying the present invention to the polymerization of isobutylene will be apparent from the following example.

400 volumes of commercial isobutylene which had been scrubbed with caustic soda to remove impurities, were diluted with 200 volumes of liquid ethylene and into this mixture was sprayed a solution of aluminum chloride in methyl chloride (concentration about 0.4%). Polymerization by this spray method proceeded very rapidly taking only one-quarter or less time than the production of copolymer under similar conditions and also taking substantially less time than polymerizing isobutylene under similar conditions but without spraying the catalyst. After polymerization, the catalyst was killed with alcohol and the polymer was run through a Banbury mixer and a rubber mill. The yield was 85% and the molecular weight about 180,000. This molecular weight is substantially higher than would be obtained by polymerizing isobutylene with the same catalyst but with ordinary agitation instead of spraying.

Other catalyst may be used such as boron fluoride complexes with water or sulfuric acid, usually made by saturating these with boron fluoride as well as many of the catalysts listed above as suitable for copolymerization reactions.

Viscous or solid polymers having a molecular weight substantially above 1,000 may also be made from other low molecular weight olefins, such as butadiene, propylene, and even ethylene, by adjusting the polymerization conditions—for example, pressures above atmospheric may be used, e. g., 5, 50, 200, or even 2,000 atmospheres or more.

The liquid in which the catalyst is dispersed (preferably dissolved) should have a freezing point not substantially above (e. g. not more than about 20° C. higher than) the polymerization temperature.

Although it is preferred to spray or atomize the catalyst into the liquid mass to be polymerized, it is also possible to use other means such as injecting the catalyst liquid in the form of one or more fine jets or it may be injected through a porous thimble under sufficient pressure to obtain the desired speed of addition of the catalyst, so long as means are provided for vigorous agitation around the jets to prevent clogging.

It is considered that the invention is particularly applicable to polymerization processes where the product formed by simple polymerization or copolymerization has such a high molecular weight e. g., above 1,000, preferably above 5,000, that it is viscous or a plastic solid and, in fact, is too viscous for suitable agitation by stirring or kneading, one of the most harmful results of this high viscosity being the prevention of quick dispersion of the product with the resultant causing of local overheating and accumulation of unreacted catalyst in the product.

It is not intended that the invention be limited to the specific examples which have been given merely for the sake of illustration nor to any theories given as to the operation of the invention, but only by the appended claims in which it is intended to claim all novelty inherent in the invention as broadly as the prior art permits.

We claim:

1. The process of preparing synthetic linear hydrocarbon co-polymers having a molecular weight above about 1,000 which comprises dissolving aluminum chloride in a low molecular weight alkyl halide solvent at a temperature not substantially below room temperature, said solvent having a freezing point below −40° C., cooling the resultant solution to a temperature at least as low as about −40° C., atomizing said pre-cooled catalyst solution into finely divided liquid particles, and dispersing said liquid particles into a polymerizable liquid mass containing at least about 70% by volume of liquid isobutylene and not more than about 30% by volume of liquid butadiene, said polymerizable mass being diluted with from 100 to 200% by volume of liquefied normally gaseous hydrocarbon boiling at least as low as the desired co-polymerization temperature and being inert to said co-polymerization reaction, said polymerizable mass being maintained at a temperature at least as low as −40° C.

2. The process of preparing isobutylene polymers having a molecular weight above about 1,000 which comprises dissolving aluminum chloride in a low molecular weight alkyl halide solvent at a temperature not substantially below room temperature, said solvent having a freezing point below −40° C., cooling the resultant solution to a temperature at least as low as about −40° C., atomizing said pre-cooled catalyst solution into finely divided liquid particles, dispersing said liquid particles into a liquid mixture comprising isobutylene as the sole polymerizable constituent and being maintained at a temperature at least as low as about −40° C.

3. The method of catalytically forming high molecular weight hydrocarbon polymers by a liquid phase exothermic reaction from a low molecular weight liquefied iso-olefin reactant that readily polymerizes at temperatures below −10° C. in the presence of a Friedel-Craft catalyst, which comprises forming a dilute solution of a Friedel-Craft catalyst in a low molecular weight organic solvent, said solution containing the catalyst in a concentration of about 0.1% to about 2.0% and remaining in liquid phase at a temperature below −40° C., cooling said dilute catalyst solution to a temperature below −40° C., atomizing said cooled solution to fine liquid droplets, and bringing said fine liquid droplets of the catalyst solution in the form of a mist into contact with the liquefied iso-olefin reactant maintained in liquid phase at a polymerization temperature below −40° C., said liquid reactant being agitated during reaction.

4. The method as described in claim 3, in which said liquefied iso-olefin reactant is liquefied isobutylene, and said reactant is mixed with a substance that acts as a refrigerant.

5. In the process of preparing high molecular weight hydrocarbon polymers from a low molecular weight iso-olefin at a reaction temperature below −10° C. with a Friedel-Craft halide polymerization catalyst, the improvement consisting in forming a liquid solution of the catalyst in a solvent having a freezing point below the reaction temperature and being inert in the reaction, atomizing said liquid catalyst solution into finely divided liquid particles, and dispersing said particles into a liquid mass containing the polymerizable low molecular weight iso-olefin reactant in the liquid state at the reaction temperature below −10° C.

6. In the process of preparing hydrocarbon viscous to solid linear hydrocarbon polymers having molecular weights above 1,000 by the polymerization of low molecular weight iso-olefin and low molecular weight conjugated diolefin reactants with a Friedel-Craft halide catalyst at a temperature below −10° C., the improvement consisting in dispersing said catalyst in an organic liquid having a freezing point substantially below −10° C. and having no deleterious effect on the polymerization reaction, atomizing said liquid containing the dispersed catalyst into finely divided liquid particles, and dispersing said particles into the iso-olefin and diolefin reactants maintained in a liquid phase at a reaction temperature below −10° C.

7. In the process for producing high molecular weight hydrocarbon polymers from liquefied isobutylene at a reaction temperature below −10° C. with an active Friedel-Craft halide polymerization catalyst, the improvement which comprises dissolving the catalyst in an organic liquid having a freezing point below the reaction temperature and having no deleterious effect on the polymerization reaction, atomizing the solution of the catalyst into fine liquid droplets having volumes of not substantially more than .01 cc., and dispersing said droplets into the liquefied isobutylene maintained at a reaction temperature below −10° C.

ROBERT M. THOMAS.
IRVING E. LIGHTBOWN.